Nov. 28, 1950 F. N. G. KRANICK 2,531,818
TRACTOR
Filed July 1, 1946 2 Sheets-Sheet 1

INVENTOR
Frank N. G. Kranick
BY
Emerson B. Donnell
ATTORNEY

Nov. 28, 1950  F. N. G. KRANICK  2,531,818
TRACTOR

Filed July 1, 1946  2 Sheets-Sheet 2

INVENTOR
Frank N. G. Kranick
BY
Emerson B. Donnell
ATTORNEY

Patented Nov. 28, 1950

2,531,818

UNITED STATES PATENT OFFICE 2,531,818

TRACTOR

Frank N. G. Kranick, Racine, Wis., assignor to
J. I. Case Company, Racine, Wis., a corporation
of Wisconsin Application July 1, 1946, Serial No. 680,740

9 Claims. (Cl. 180—53)

1

The present invention relates to tractors and an object of the invention is to generally improve the construction and operation of devices of this class.

A further object is to provide a tractor having improved visibility, especially under the mid-portion thereof.

A further object is to provide a tractor construction such that tractors of its general type may be conveniently and inexpensively supplied in various lengths.

A further object is to provide a tractor having a so-called constant running power take-off and a novel and advantageous arrangement of the parts necessary for such a power take-off.

A further object is to provide a novel and advantageous location for a belt pulley in such a tractor and a novel expedient for driving the same.

Further objects and advantages will become apparent from the following specification and accompanying drawings in which a satisfactory embodiment of the invention is shown. However, it is to be understood that the invention is not limited to the details disclosed but includes all such variations and modifications as fall within the spirit of the invention as herein expressed.

Figures 1, 2:
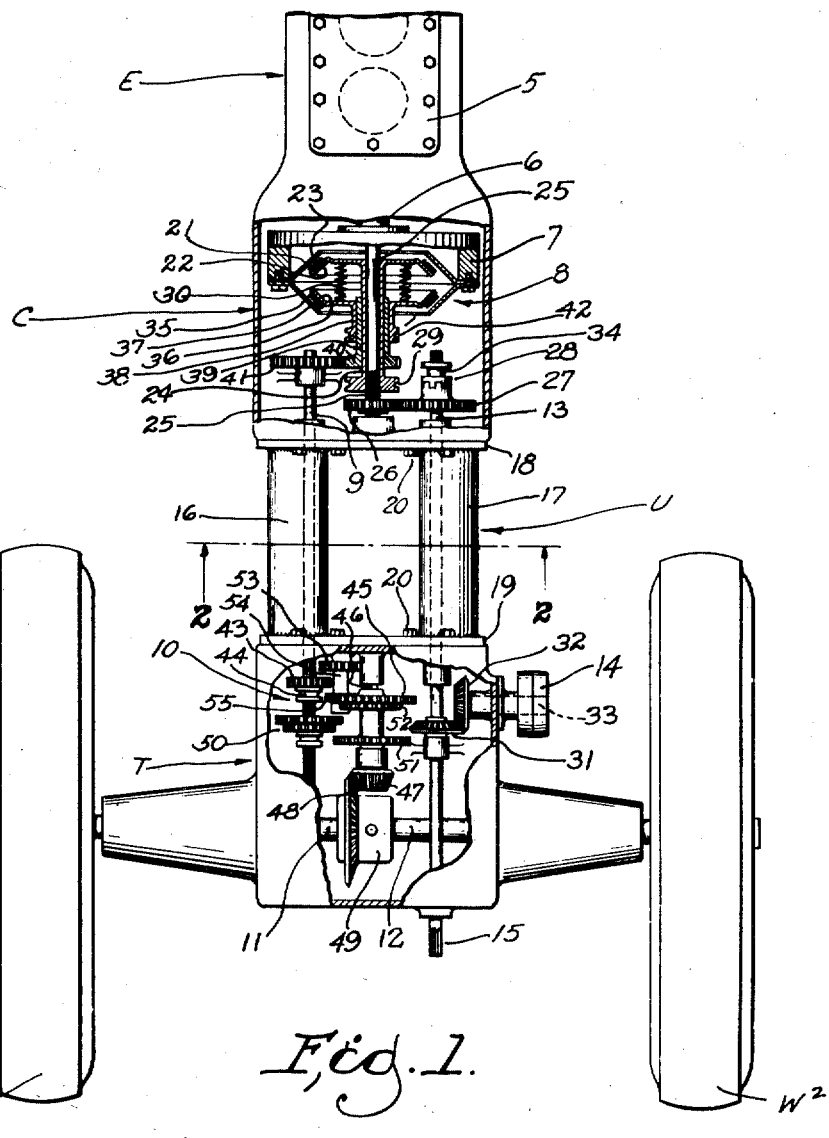
Figure 1 is a plan view of so much of a tractor as is necessary to illustrate the invention with parts broken away to show interior aspects thereof and others which form no part of the invention removed to avoid unnnecessary complication.
Fig. 2 is a sectional view taken on the line 2—2 of Fig. 1 with parts removed.

As seen in Fig. 1, the tractor comprises generally an engine E in the present instance connected with a clutch housing C, a transmission and axle housing T and a connecting unit U. The tractor is provided with traction wheels $W^1$ and $W^2$ and as will be understood with front wheels not shown as they form no part of the present invention. Certain controls of well-known type and an operator's seat, common parts of all tractors, are to be understood but are not illustrated since they form no part of the invention.

Returning to a more detailed description of the invention, engine E includes a cylinder block 5, and a crank shaft 6 to which is fixed a flywheel 7. In operation, shaft 6 and flywheel 7 rotate during the operation of the engine and the motion is transmitted to wheels $W^1$ and $W^2$ as will appear.

2

Flywheel 7 embodies a clutch device generally designated as 8 from which the motion is transmitted through a shaft 9 and a change speed transmission or gear set, generally designated as 10 to axle shafts 11 and 12 connected respectively with wheels $W^1$ and $W^2$ in well-known manner. Shaft 9 as is apparent in Fig. 1 constitutes a part of change speed mechanism 10 and is supported in well-known manner, the rear end thereof being carried in a suitable bearing carried by housing T, but not shown since it forms no part of the invention. Motion is also transmitted from clutch 8 through a shaft 13 to a belt pulley 14 in the present instance carried by transmission housing T, shaft 13 continuing through the rear of housing T and being splined or otherwise shaped or characterized at 15 to serve as a power take-off shaft.

It will be noted that shafts 9 and 13 are spaced apart laterally and enclosed respectively in tubular elements 16 and 17, forming the major portion of unit U, elements 16 and 17 being permanently united with flanges 18 and 19 which are readily fixed with housings C and T respectively by means of bolts or similar fastenings 20—20. In practice, flanges 18 and 19 are preferably cut from heavy sheets, such as boiler plate, and tubes 16 and 17 are cut from standard metal tubular stock and unit U is fabricated by welding or the like into the form illustrated. It will now be apparent that in the event of demand for a tractor of greater or lesser wheel base, this may be readily provided without making new patterns or other expensive tooling changes. It is merely necessary to cut longer sections of tubing 16 and 17 and longer sections of shaft 9 and 13. A shorter tractor may be furnished by reversing this change and making the several elements shorter.

In view of the separate shafts 9 and 13, for the main drive and the power take-off respectively, clutch device 8 is so constituted as to control the two shafts independently. It has in the present instance an internal cone portion 21 into the interior of which is pressed an external cone portion 22 faced with suitable friction material 23. Cone portion 21 is rigid with flywheel 7 and cone portion 22 has a sleeve 24 slidably keyed to a shaft 25 which is rotatable relatively to flywheel 7 and piloted therein in well-known manner. Shaft 25 drives, through a gear 26, a gear 27 journaled on above mentioned shaft 13 and which is connected therewith or disconnected therefrom by means of a clutch element 28, slidably keyed to shaft 13. A control spool 29 is connected with any suitable shipper device of well-known type not shown and removes cone 22 from contact with cone 21. When not so removed, cone 22 is forced into clutching engagement with cone 21 by a plurality of springs 30. Thus it will be apparent that shaft 13 is driven directly from engine crank shaft 6 entirely independently of any other drive present on the tractor.

Shaft 13, within transmission housing T carries a gear 31 engaging a gear 32 on a belt pulley shaft 33 journaled in housing T and carrying above mentioned belt pulley 14. Pulley 14 is therefore responsive also to clutch element 22 and is thus controlled independently of shaft 9. When it is not desired to run shaft 13 or belt pulley 14, clutch 28 may be disengaged from gear 27 by means of a shipper spool 34, whereupon engagement of clutch cones 22 and 21 will rotate gear 27 idly without actuating shaft 13 or belt pulley 14.

Clutch device 8 includes also a cone 35 fixed with flywheel 7 and a cone portion 36 faced with suitable friction material 37 and pressed into engagement with cone 35 by above mentioned springs 30. Cone 36 has a sleeve 38 slidably keyed to a sleeve 39 which carries a gear 40 meshing with a gear 41 fixed with above mentioned shaft 9. Sleeve portion 38 has a spool 42 engaged by a suitable shipper not shown whereby cone 36 may be shifted out of engagement with cone 35. Engagement of cones 36 and 35 will drive shaft 9 and traction wheels W¹ and W² as will appear.

Above mentioned shaft 9 is the main propeller shaft of the tractor and actuates axle shafts 11 and 12 through above mentioned change gear transmission 10. Any suitable transmission contemplated as within the scope of the invention but in the present instance, shaft 9 has a sliding gear 43 which may be shifted by means of a shipper spool 44 into engagement with a gear 45 on a shaft 46 suitably supported for rotation in transmission housing T. Shaft 46 carries a bevel gear 47 engaged with a ring gear 48 carried by a differential gear unit 49, which actuates axle shafts 11 and 12 in well-known manner not necessary to further describe. Shaft 9 also carries a gear cluster 50 engageable with other gears 51 and 52, also on shaft 46 to give other speeds or gear ratios in the transmission 10. Gear 43 is also shiftable into engagement with a gear 53 which actuates above mentioned gear 45 by means of a short shaft 54 and gear 55, resulting in reverse rotation of gear 45 and therefore of axle shafts 11 and 12. Suitable shipper mechanisms for shifting said gears are well understood and not necessary to illustrate.

It will now be apparent that visibility of the ground beneath the tractor is easily possible through the opening between tubes 16 and 17. This is highly desirable in certain types of cultivating. It will also be apparent that a main drive for the tractor is extended through tube 16 while an auxiliary power take-off drive is extended through tube 17. In view of the lateral separation of tubes 16 and 17, conflict between the two drives is easily avoided. Furthermore, a drive is provided in which power take-off 15 is controlled entirely independently of main drive shaft 9 and main clutch element 36.

Figure 3:
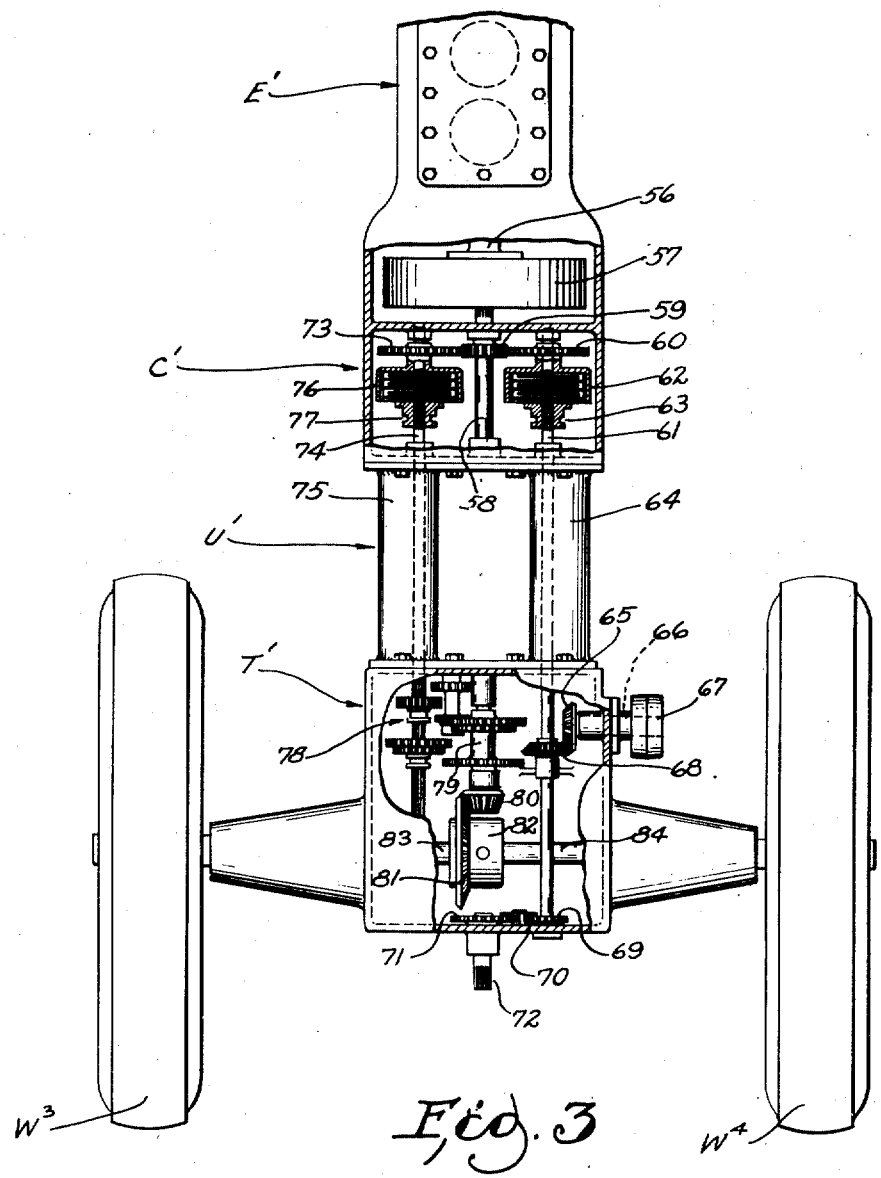
Fig. 3 is a view similar to Fig. 1 but showing a modified construction.

A modification of the above described arrangement but which includes similar desirable characteristics is shown in Fig. 3. In this arrangement an engine E' drives through a clutch house C' mechanism within a transmission and axle housing T', the two housings being connected by a spacing unit U' similar to that described in connection with Fig. 1. In the modified embodiment, engine E' has a crankshaft 56 and a flywheel 57 to which is connected for rotation therewith a shaft 58. Shaft 58 therefore rotates whenever engine E' operates. Shaft 58 actuates, through a gear 59, a gear 60 journaled on a shaft 61 and which may be operatively connected thereto by a clutch 62, in the present instance a multiple disc clutch of well-known form. Clutch 62 is controlled by a shipper spool 63 and suitable shipper mechanism of well-known form not necessary to further describe.

Shaft 61 extends rearwardly through a tube 64 corresponding to above described tube 17, and drives a gear 65 on a belt pulley shaft 66 which in turn carries belt pulley 67. Shaft 61 drives gear 65 through a gear 68.

Shaft 61 continues rearwardly and has a gear 69 which drives, through an idler gear 70, gear 71 on a power take-off shaft 72. In this manner power take-off shaft 72 is made responsive to clutch 62 independently of the forward motion of the tractor.

Said forward motion is also obtained from gear 59 which drives a gear 73 journaled on a shaft 74 extending rearwardly through a tube 75 corresponding to above described tube 16. Gear 73 is journaled on shaft 74 and may be connected therewith by means of a clutch 76, in the present instance a multiple disc clutch of well-known form, controlled by a shipper spool 77 actuated by a suitable shifting apparatus of well-known type not necessary to describe.

Shaft 74 drives, through a change gear set or transmission generally described as 78, a shaft 79 in a manner identical with that of above described transmission 10, so that further description should be unnecessary. Similarly shaft 79 drives, through gear 80 and 81, a differential gear 82 which actuates axle shafts 83 and 84 connected respectively with traction wheels W³ and W⁴.

It will be apparent that the main advantages of the Fig. 1 embodiment are present in this modification. The operation of the invention is clearly apparent from the above description and it will now be apparent that expedients have been provided for the realization of the hereinabove recited objects of the invention. What is claimed as new and desired to be secured by Letters Patent of the United States is:

1. A tractor construction including an engine and clutch housing, a transmission and axle housing longitudinally spaced from the engine and clutch housing and an exchangeable connecting unit between the housings comprising a plurality of narrow tubular elements having end flanges permanently uniting them so as to provide a space therebetween through which the ground immediately beneath the tractor is visible from an operating position on the tractor, a drive shaft extending between said housings and through one of said tubular elements, and power take-off means extending from said engine and clutch housing through the other tubular element to the rear of the tractor.

2. A tractor construction including an engine and clutch housing, a transmission and axle housing longitudinally spaced from the engine and clutch housing and connecting means between the housings comprising a plurality of laterally spaced narrow tubular elements providing a space therebetween through which the ground immediately beneath the tractor is visible from an operating position on the tractor, a plurality of clutch devices in said clutch housing driven by said engine, a drive shaft in one of said tubular elements controlled by one of said clutch devices, change speed mechanism in said transmission and axle housing actuated by said drive shaft, an axle in said transmission and axle housing and driven by said change speed mechanism and a power take-off shaft supported by said transmission and axle housing and driven from another of said clutch devices through another of said tubular elements so as to be operatively independent of said drive shaft and axle.

3. A tractor construction including an engine and clutch housing, a transmission and axle housing longitudinally spaced from the engine and clutch housing and connecting means between the housings comprising a plurality of laterally spaced narrow tubular elements providing a space therebetween through which the ground immediately beneath the tractor is visible from an operating position on the tractor, a plurality of clutch devices in said clutch housing driven by said engine, a drive shaft in one of said tubular elements controlled by one of said clutch devices, change speed mechanism in said transmission and axle housing actuated by said drive shaft, an axle in said transmission and axle housing and driven by said change speed mechanism and a power take-off shaft supported by said transmission and axle housing and driven from another of said clutch device through another of said tubular members so as to be operatively independent of said drive shaft and axle, and a belt pulley shaft connected with and driven by said power take-off shaft.

4. A tractor construction including an engine and clutch housing, a transmission and axle housing longitudinally spaced from the engine and clutch housing and connecting means between the housings comprising a plurality of laterally spaced narrow tubular elements providing a space therebetween through which the ground immediately beneath the tractor is visible from an operating position on the tractor, a plurality of clutch devices in said clutch housing driven by said engine, a drive shaft in one of said tubular elements controlled by one of said clutch devices, change speed mechanism in said transmission and axle housing actuated by said drive shaft, an axle in said transmission and axle housing and driven by said change speed mechanism and a power take-off shaft supported by said transmission and axle housing and driven from another of said clutch devices through another of said tubular members so as to be operatively independent of said drive shaft and axle, and a belt pulley shaft supported on the transmission and axle housing and connected with and driven by said power take-off shaft.

5. A tractor construction including an engine and clutch housing, a transmission and axle housing longitudinally spaced from the engine and clutch housing, connecting means between the housings comprising a plurality of laterally spaced tubular elements, a drive shaft extending between said housings and through one of said tubular elements and power take-off means extending from said engine and clutch housing through the other tubular element to the rear of the tractor.

6. A tractor construction including an engine and clutch housing, a transmission and axle housing longitudinally spaced from the engine and clutch housing and connecting means between the housings comprising a plurality of laterally spaced narrow tubular elements providing a space therebetween through which the ground immediately beneath the tractor is visible from an operating position on the tractor, a plurality of clutch devices in said clutch housing driven by said engine, a drive shaft in one of said tubular elements controlled by one of said clutch devices, change speed mechanism in said transmission and axle housing actuated by said drive shaft, an axle in said transmission and axle housing and driven by said change speed mechanism, and power take-off means extending from said engine and clutch housing, controlled by another of said clutch devices and extending through another of said tubular elements to the rear of the tractor.

7. A tractor construction including an engine and clutch housing, a transmission and axle housing longitudinally spaced from the engine and clutch housing and connecting means between the housings comprising a plurality of laterally spaced narrow tubular elements providing a space therebetween through which the ground immediately beneath the tractor is visible from an operating position on the tractor, a plurality of clutch devices in said clutch housing driven by said engine, a drive shaft in one of said tubular elements controlled by one of said clutch devices, change speed mechanism in said transmission and axle housing actuated by said drive shaft, an axle in said transmission and axle housing and driven by said change speed mechanism and a power take-off shaft supported by said transmission and axle housing and driven from another of said clutch devices by a second drive shaft passing through another of said tubular members so as to be operatively independent of the first drive shaft and axle.

8. A tractor construction including an engine and clutch housing, a transmission and axle housing longitudinally spaced from the engine and clutch housing and a connecting unit constituting a frame section between the housings comprising a plurality of laterally spaced narrow tubular elements providing a space therebetween through which the ground immediately beneath the tractor is visible from an operating position on the tractor, a plurality of clutch devices in said clutch housing driven by the engine, a drive shaft extending through said unit between said housings controlled by one of said clutch devices, change speed mechanism in said transmission and axle housing actuated by said drive shaft, an axle in said transmission and axle housing and driven by said change speed mechanism, a power take-off shaft extending through said unit to the rear of the tractor and driven from another of said clutch devices, a belt pulley shaft supported on the tractor, and driving connections from said power take-off shaft to said belt pulley shaft for driving said belt pulley shaft independently of said drive shaft.

9. A tractor construction including an engine and clutch housing, a transmission and axle housing longitudinally spaced from the engine and clutch housing, a connecting frame section between the housings comprising a plurality of laterally spaced narrow tubular elements providing a space therebetween through which the ground immediately beneath the tractor is visible from an operating position on the tractor, a plurality of clutch devices in said clutch housing driven by said engine, a drive shaft extending through said connecting frame section and controlled by one of said clutch devices, a change speed mechanism in said transmission and axle housing actuated by said drive shaft, an axle in said transmission and axle housing and driven by said change speed mechanism, and power take-off means extending through said connecting frame section to the rear of the tractor and driven from another of said clutch devices so as to be operatively independent of said drive shaft and change speed mechanism.

FRANK N. G. KRANICK.

REFERENCES CITED

The following references are of record in the file of this patent:

UNITED STATES PATENTS

| Number | Name | Date |
|---|---|---|
| 1,343,682 | Richmond | June 15, 1920 |
| 1,892,865 | Brown | Jan. 3, 1933 |
| 2,035,867 | Cross | Mar. 31, 1936 |
| 2,187,425 | Johnston | Jan. 16, 1940 |
| 2,202,345 | Johnson | May 28, 1940 |
| 2,247,668 | Rosenthal | July 1, 1941 |

FOREIGN PATENTS

| Number | Country | Date |
|---|---|---|
| 99,711 | Austria | Apr. 25, 1925 |
| 337,610 | Germany | June 4, 1921 |